United States Patent
Dudley

[11] 3,713,696
[45] Jan. 30, 1973

[54] VEHICLE SEAT CONSTRUCTION
[75] Inventor: Richard Dudley, Harlington, England
[73] Assignee: General Motors Corporation, Detroit, Mich.
[22] Filed: May 20, 1971
[21] Appl. No.: 145,160

[52] U.S. Cl.................297/452, 297/DIG. 1, 297/458
[51] Int. Cl.......A47c 27/14, A47c 27/22, B60n 1/06
[58] Field of Search..............297/445, 452, 453–456, 297/DIG. 1, DIG. 2

[56] References Cited
UNITED STATES PATENTS

| | | |
|---|---|---|
| 3,574,401 | 4/1971 | Lehner....................297/453 |
| 3,529,866 | 9/1970 | Getz.......................297/452 |
| 3,259,435 | 7/1966 | Jordan, Jr...............297/455 |
| 3,293,671 | 12/1966 | Griffin....................297/457 |

Primary Examiner—Casmir A. Nunberg
Attorney—W. E. Finken and H. Furman

[57] ABSTRACT

A vehicle seat bottom or back squab comprises a pan having a plurality of separate pads attached thereto. These pads may be spaced apart to leave a channel or channels. Each pad may be located by inter-fitting with a shaped part of the pan. Portions of the pan may be cut away to form resilient cantilever portions, carrying padded material.

8 Claims, 6 Drawing Figures

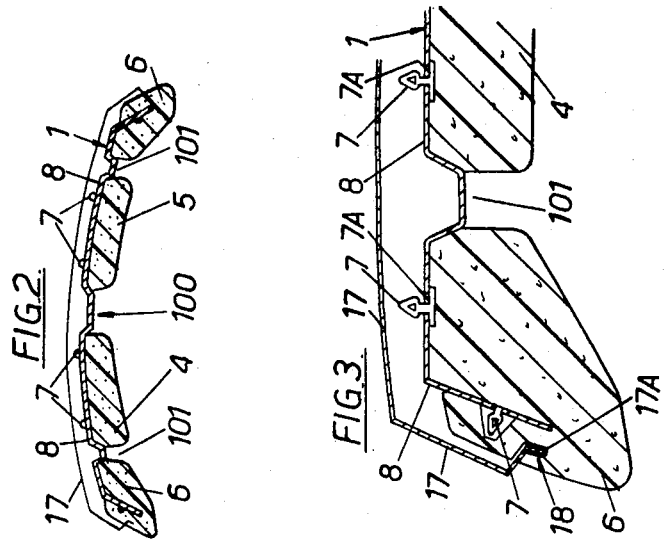
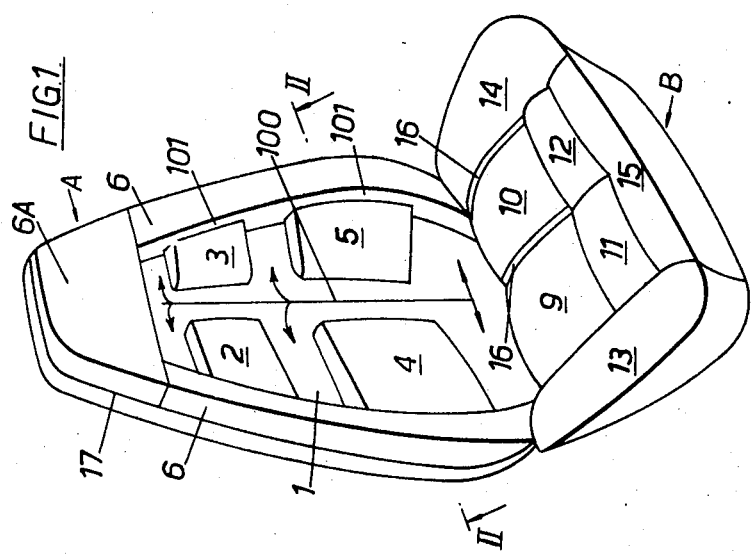

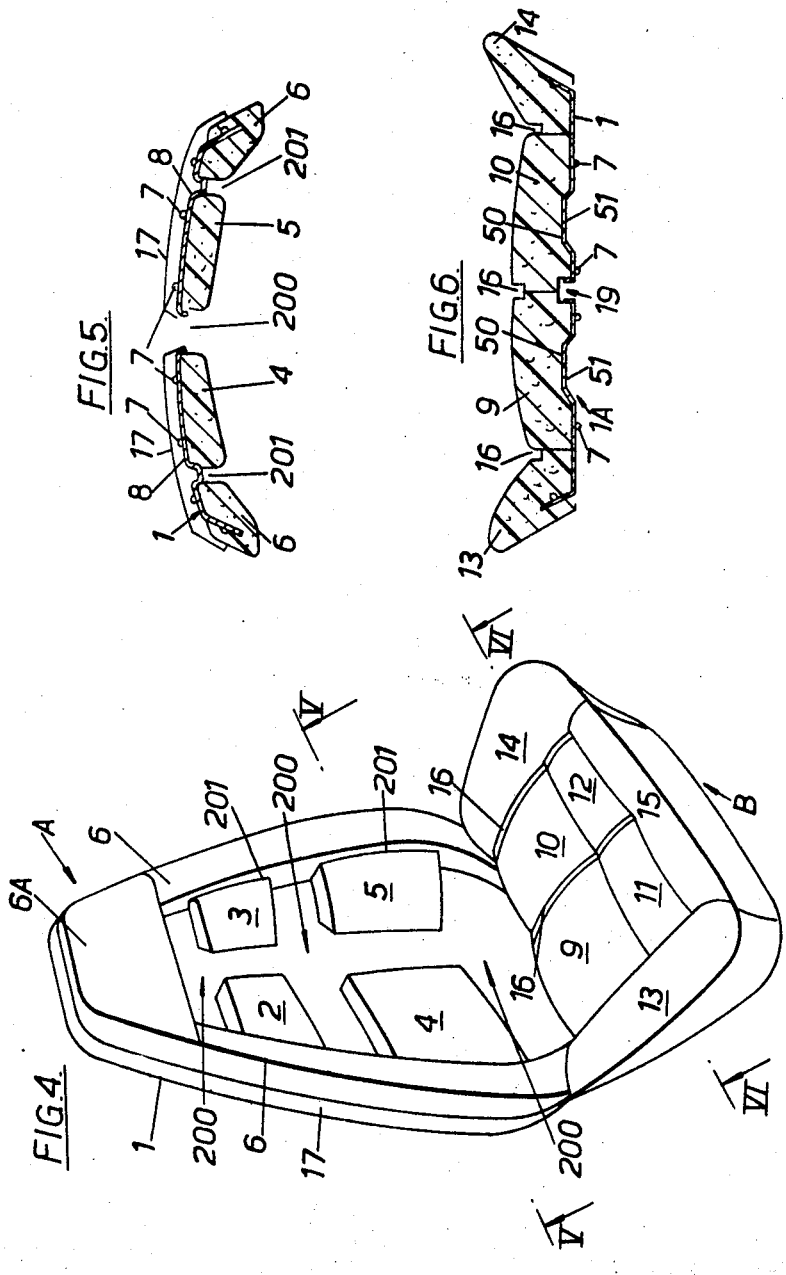

VEHICLE SEAT CONSTRUCTION

This invention relates to vehicle seat construction, and has for its main object to provide a vehicle seat squab having a pan of substantially rigid sheet metal or plastics material, with padded foam material attached thereto, which squabs are simple and economical to make in large qUantities and which permit of adequate body ventilation for the user, despite the possible use of "non-breathing"d foamed materials as padding.

Examples of seat constructions according to the invention are described below with reference to the accompanying drawings in which:

FIG. 1 is a perspective view of a seat of the "bucket" (i.e. individual) type;
FIG. 2 is a section on the plane II—II in FIG. 1;
FIG. 3 is an enlargement of part of FIG. 2;
FIG. 4 is a perspective view of a modified seat construction;
FIG. 5 is a section on the plane V—V in FIG. 4; and
FIG. 6 is a section on the plane VI—VI in FIG. 4.

Referring to FIGS. 1 to 3, the bucket or individual seat there shown comprises two squabs A and B joined together, each squab comprising a pan 1 made of appropriate sheet material (metal or plastics) with padding fitted to it.

In the present case the bottom pan and back pan are rigidly joined together, though if desired the back pan may be capable of folding down.

The padding of each squab of the seat is made of small separate pads attached to the pan. Thus the seat back comprises a pan 1 which may be of pressed steel or moulded plastics sheet-material, and which has attached to it pads such as 2, 3, 4 and 5 which are spaced apart as shown to leave channels between them. The padding of the back is completed by a padded edging 6 also secured to the pan 1 and a head restraint pad 6a.

These channels comprise larger channels 100, (indicated by arrows in FIG. 1) separating the pads 2, 3, 4 and 5 from each other and, respectively, from the head restraint pad 6A and the seat bottom pads 9, 10, 11, 12 (referred to below); and also comprise narrower channels 101 separating the pads 2, 3, 4 and 5 from the adjacent padded edging 6. Each of the pads may be secured to the pan in any convenient way, for example, as shown in FIGS. 2 and 3 by means of studs 7 fixed or bonded to the pads, which studs are secured by pressing into apertures 7A in the pan 1. Alternatively, the pads may be secured to the pan by adhesive.

In order to locate the pads such as 2, 3, 4 and 5 in the correct position and simplify assembly, each pad fits into a depression such as 8 in the pan, each depression being shaped to fit the outline of the pad. The converse would be possible, with projections in the material of the pan fitting into corresponding shaped recesses in the pads 2, 3, 4, 5 (see FIG. 6).

As to the material of the pads, these may be made of foamed plastics material with a non-porous skin or cover. This may be either a separate cover which is stitched on, a skin formed by spraying into the mould in which the pad is made, or an integral skin formed during the foaming process, such as a polyurethane skin.

Due to the "non-breathing" properties of these skin materials, ventilation is required when a person is sitting on the seat, and this ventilation is given by movement of air in the channels between the pads, as shown by the arrows 100 in FIG. 1.

The seat bottom shown in FIG. 1 is of similar construction to the back, being made up of a pan of pressed steel or moulded plastics material, on which separate pads 9, 10, 11, 12 are secured by means similar to those described above in connection with the seat back. This seat bottom construction is substantially the same as shown in section in FIG. 6, where 1A is the seat bottom pan. The padding of the seat is completed by side and front edging pads 13, 14, 15. In the case of the seat bottom, the pads are not spaced apart, but rather shaped to provide ventilation grooves such as 16 in FIGS. 1 and 6.

To give a satisfactory appearance to the back of the seat, a seat back cover 17 which may consist of a vacuum-formed semi-rigid material is secured round the back by snapping the shaped edges 17A into a rebate moulded into the edging pad 6 itself, as shown at 18 in FIG. 3.

FIGS. 4 to 6 illustrate a modified design, in which the seat bottom is the same as in FIGS. 1 to 3, but the pan 1 of the seat back has areas between the pads 2, 3, 4 and 5 cut away leaving spaces 200 as shown in FIGS. 4 and 5. In this way the portions of the pan 1 supporting the individual pads 2, 3, 4, 5 are each of cantilever or blade-like structure and are resilient, so that the deflection of these blades acts as a secondary suspension medium. As shown in FIG. 6 this feature of the spaces may also be included by cutting away a portion or portions of the seat bottom pan as shown for example at 19. Side channels 201, similar to the channels 101 in FIGS. 1 – 3, are provided between the pads 2 – 5 and the adjacent padded edging 6. Parts of FIGS. 4 – 6 not specifically described are substantially the same as the parts having the same reference numerals in FIGS. 1 – 3, unless otherwise indicated. One difference of construction in FIG. 6 should be noticed. This is as respects the location of the pads 9, 10, 11 and 12. Instead of being fitted into depressions in the pan, each pad has recesses 50 into which fit correspondingly-shaped projections 51 in the pan 1. The ventilation by movement of air in the channels 16, 200 and 201 is similar to that in FIGS. 1 – 3.

I claim:

1. A seat squab comprising a pan of substantially rigid sheet material, pads secured side-by-side on said pan so as jointly to form a padded rest surface, and integral formations in said pan and in each pad which formations interfit so as to locate each pad relative to the pan.

2. A seat squab comprising a pan of substantially rigid sheet material, pads of foamed material secured side-by-side on said pan so as jointly to form a padded rest surface, integral formations in said pan and in each pad, which formations are interfitting so as to locate each pad relative to the pan, and a channel separating the rest surface of at least one pad from the rest surface of an adjacent pad.

3. A seat squab according to claim 2, in which said interfitting formations comprise integral depressions in said pan and complementary integral projections respectively in said pads.

4. A seat squab comprising a pan of substantially rigid material, pads of foamed material secured side-by-side on said pan so as jointly to form a padded rest surface, at least some of the pads being spaced apart to provide channels between them, and integral formations in said pan and in each pad, which formations are interfitting so as to locate each pad relative to the pan.

5. A seat squab according to claim 4, in which the material of the pan is removed below the space separating said spaced-apart pads.

6. A seat squab comprising a pan of substantially rigid sheet material, which pan includes resilient spaced-apart cantilever portions, pads of foamed material secured respectively to said cantilever portions, said pads being side-by-side so as jointly to form a padded rest surface, integral formations in each of said cantilever portions and in each of said pads, which formations are interfitting so as to locate each pad relative to the cantilever portion to which it is secured.

7. A seat squab according to claim 6, in which said interfitting formations comprise integral depressions in said pan material and complementary integral projections respectively in said pads.

8. A seat comprising a back squab and a bottom squab; each squab including a pan of substantially rigid sheet material, pads of foamed material secured side-by-side on said pan so as jointly to form a padded rest surface, integral formations in said pan and in each pad respectively which formations are interfitting so as to locate each pad relative to the pan, and a channel separating the rest surface of at least one pad from the rest surface of an adjacent pad, portions of the material of said pan being removed between adjacent pads to form resilient cantilever portions.

* * * * *